Jan. 24, 1967  S. J. SPIECE ETAL  3,300,570
POWER DISTRIBUTION CONNECTION APPARATUS
Filed March 19, 1963  3 Sheets-Sheet 1

INVENTORS.
STANLEY J. SPIECE
BY RICHARD J. LANG

Andrus & Starke
ATTORNEYS

INVENTORS.
STANLEY J. SPIECE
RICHARD J. LANG
BY
Andrus & Starke
ATTORNEYS

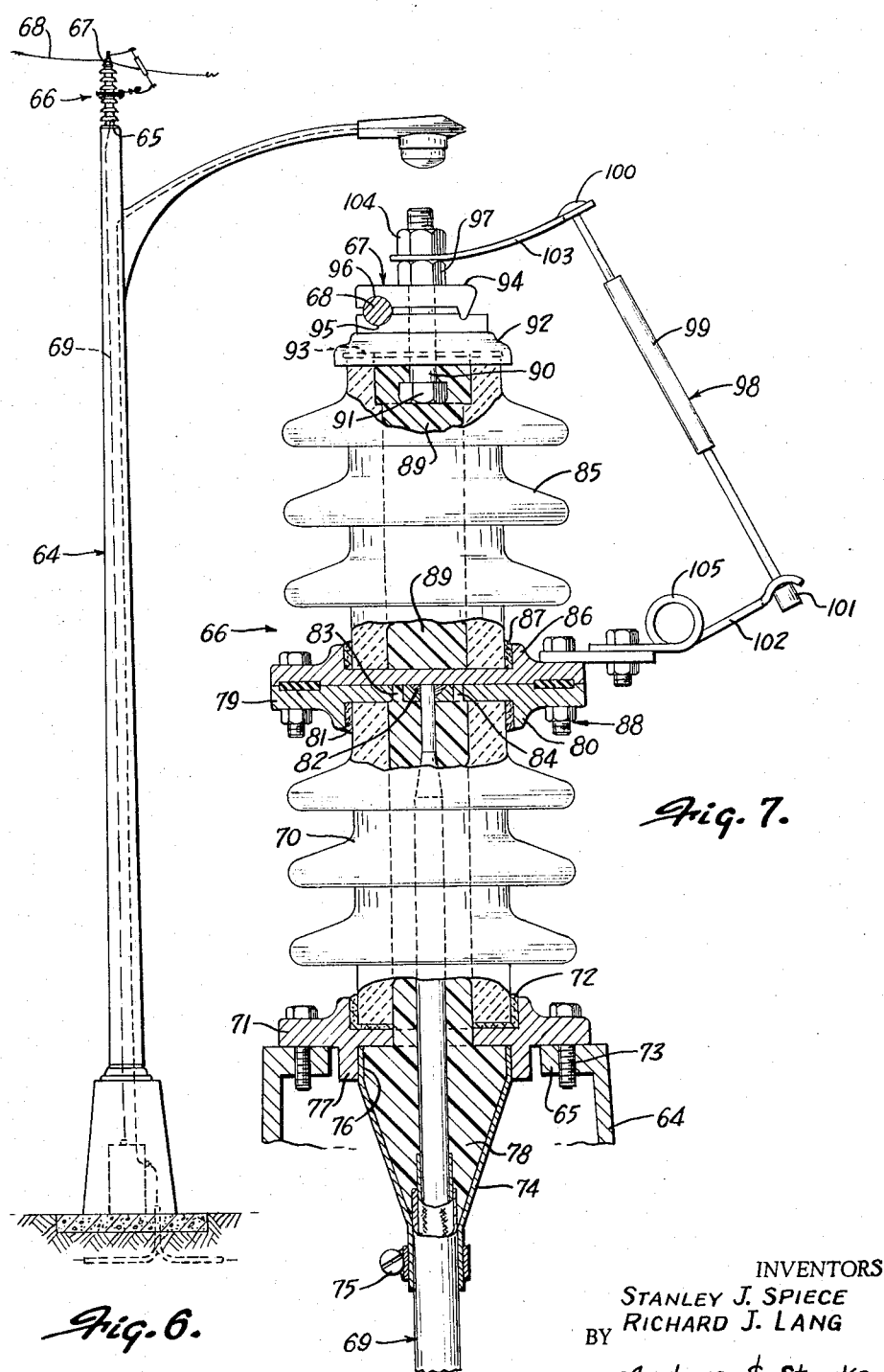

3,300,570
POWER DISTRIBUTION CONNECTION
APPARATUS
Stanley J. Spiece, Milwaukee, Wis., and Richard J. Lang, Grand Rapids, Mich., assignors to McGraw-Edison Company, Milwaukee, Wis., a corporation of Delaware
Filed Mar. 19, 1963, Ser. No. 266,315
6 Claims. (Cl. 174—38)

This invention relates to power distribution apparatus and to a method of making such apparatus and particularly to a tap cable unit for interconnecting a high voltage line to auxiliary equipment such as a distribution transformer.

In the distribution of electrical power, power is transmitted from the central plant over high voltage primary lines to the various power consuming areas. Distribution transformers are connected to the high voltage primary lines and establish a low voltage suitable for operating various loads.

Generally, past practice has employed overhead or aerial distribution systems wherein both the primary and secondary wires and associated equipment were carried on cross arms secured to the upper end of pole members. More recently, underground distribution systems for residential service have become of increasing importance. Completely underground systems for residential service usually require a loop feed system with expensive switching stations and a sectionalizing switch at each transformer, and the higher expense of a completely underground system has prevented its adoption generally for residential service. In United States Patent 3,187,175 to R. J. Lang a combined street lighting and residential power distribution system is disclosed which is considerably less expensive than a completely buried system for residential service and still eliminates the cross arms on the pole and presents a pleasing appearance, reduces the problems of wind, ice, tree-limb and lightning damage in comparison to an overhead system, places all transformer connections at ground level for ease of maintenance and transformer changeout, and permits all of the power system cable but the primary cable to be buried in a common trench with street lighting and telephone with the result that duplication of street lighting and power crews, facilities, and installation is eliminated. In such combined street lighting and residential power system, the primary overhead line is carried at the upper end of the pole, and the secondary distribution system is buried in a shallow trench. The distribution transformers are aerial, ground or sub-surface mounted and connected to the overhead primary line by a suitable connecting or tap cable.

The tap cable is generally a metallically shielded cable having an inner current conductor within a suitable insulating covering and an outer sheath or jacket. The inner conductor is connected to the primary line and the distribution transformer and the outer sheath is grounded. The cable jacket must be removed for a predetermined distance from the end of the cable conductor to establish surface insulation between the live conductor and the grounded jacket which will, under all normal conditions, prevent flashover.

When the cable sheath is terminated, the flux and equipotential lines are densely concentrated adjacent the ends of the sheath. Generally, within the sheath portion of the cable, the equipotential lines extend parallel to the cable and the field intensity or flux extends radially in a plane normal to the axis of the cable. However, at the point where the sheath is terminated, the equipotential lines extend in a radial as well as an axial direction and establish maximum dielectrical stress immediately adjacent the end of the sheath. The resulting high electrical stress in the area can cause insulation failure. The high concentration and electrical stress is generally avoided by suitable cable termination means which distribute the equipotential lines and the flux radially and axially of the cable.

A stress relief cone may be applied to the exposed surface insulation of the cable immediately adjacent the end of the grounded sheath to distribute the potential field. Conventionally, the cone is formed or built up by wrapping insulating tape on the exposed cable insulation to form a stress cone insulation extending axially and radially from the terminated sheath. An outer cover of a conducting braid is applied over the stress cone insulation and is electrically connected to the grounded cable sheath.

Alternatively, an integral construction may be formed including a metallic cone secured to the lead sheath and projecting axially and radially outwardly therefrom with a suitable insulating material provided within the conical portion of the cable; for example, as shown in FIG. 1 in Patent No. 1,935,820 to T. R. Scott et al.

Generally, in systems above 5 kv. stress grading means are used at all terminations. The present invention is directed to a jacketed prefabricated tap cable having new and improved cable termination construction at opposite ends for connecting the cable to a primary overhead conductor and to a transformer or similar component. Each termination includes proper insulation between the bared conductor and the adjacent ground plane of the jacket. The flashover characteristics of the respective terminations is correlated to prevent flashover within the transformer. Thus, the flashover voltage of the upper termination unit is selected with a lower flashover voltage such that flashover incident to a lightning stroke and failure of the arrester to function would occur at the upper end of the connecting cable prior to flashover between the transformer and the lower or opposite end of the cable. This is particularly desirable as flashover within the transformer is apt to puncture the transformer insulation and result in a very costly damage as well as a disruption of service.

More particularly, in accordance with the present invention, the tap cable for connection of a primary line to a distribution transformer includes the upper cable termination unit which provides a connecting end for connection to associated equipment with proper stress grading termination of the cable conductor, insulation and ground plane without undue stress at the ground plane termination. The upper cable termination unit includes an insulating shroud and an integral stress grading or relieving cone. The conductor of the cable extends into the shroud and is connected to a primary line terminal. The sheath or shielding jacket of the cable is stripped back outwardly of the shroud. The stress relief cone is integrally or firmly secured at the factory to the terminated jacket end and projects upwardly therefrom into attachment with the lower end of the porcelain shroud. A semi-conducting tape between the sheath and the cable insulation projects into the stress grading cone a short distance from the very end of the terminated sheath. The shroud and cone are filled at the factory with a resin or other insulating material having high mechanical strength, high dielectric strength, a high dielectric constant and excellent bonding qualities to minimize the voids within the uupper cable termination unit and establish high dielectric strength between the bared cable conductor and the ground sheath. The resin also hermetically seals the upper end of the tap cable to prevent entrance of moisture to the termination or the interior of the cable and siphoning of oil along the cable insulation from the transformer, as hereinafter discussed. The stress grading termination at the upper end of the cable presents an aesthetically pleasing appearance and eliminates the cross arm at the upper end of the pole and is prefabricated at the factory, thus avoiding the difficult and time consuming task of wrapping layers of insulating tape to construct a stress cone at the top of the pole.

When connected to an oil-filled transformer or the like, the new and novel lower termination means of the present invention is extremely simple and easily made in the field. The sheath is removed from the lower end of the cable for a predetermined distance to provide a desired flashover distance between the conductor and the sheath. The tap cable is passed through a suitable opening in the top portion of the oil-filled transformer tank and is supported to locate the lowermost end of the grounded sheath immersed for a predetermined distance into the transformer oil constituting the dielectric medium for the ably belled to constitute a stress relief cone with the transformer oil constituting the dielectrtic medium for the cone. This construction eliminates the costly transformer primary insulating bushing normally employed for the connection of the transformer primary to a power line tap cable. As in the upper termination construction, the outer semi-conducting tape provided immediately inside the sheath projects outwardly from the sheath to provide a resistive potential grading which in combination with the grading of the belled end reduces the stress in the insulation immediately adjacent the termination of the lower end of the grounded sheath. The tap cable employing this feature of the invention has cable insulation which is insoluble in the transformer oil and which is suitable for use at the elevated temperature of the oil under operating conditions.

In accordance with another aspect of the present invention, the upper termination includes a fuse cutout formed as a unitary part of the cable termination unit. A second porcelain shroud may be mounted to the outer end of the cable receiving shroud with a primary wire connector or terminal on the outer end and with a tap cable connector secured between the pair of stacked shrouds. A fuse cutout is mounted, internally or externally, of the outer shroud and connects the primary wire connector and the tap cable connector.

In accordance with a further feature of the present invention, the primary connector or terminal of the termination unit constitutes the overhead support for the primary line. This feature of the invention provides an integrated unit of mechanically supporting a primary conductor on a pole or the like and establishing an electrical tap or takeoff with an isolating means provided while insulating the pole therefrom. This creates a very compact and aesthetically pleasing construction and minimizes the complexity and cost of construction.

The present invention provides a very compact, efficient and nonobtrusive cable terminator particularly adapted for interconnecting of a high voltage primary line to a secondary distribution system. Although the cable termination may be field or factory installed, the upper termination is preferably formed as an integral cable unit at the factory while the lower termination is made in the field.

Various other advantages and specific features of the invention are more fully disclosed in the following embodiment of the invention.

The drawings furnished herewith illustrate the best mode presently contemplated for carrying out the invention.

In the drawings:

FIG. 6 is an elevational view, similar to FIG. 1, of an alternative construction of the present invention incorporating a fuse cutout in the upper cable termination unit; and FIG. 7 is an enlarged vertical section through the upper end of the cable termination unit shown in FIG. 6.

Figure 1:
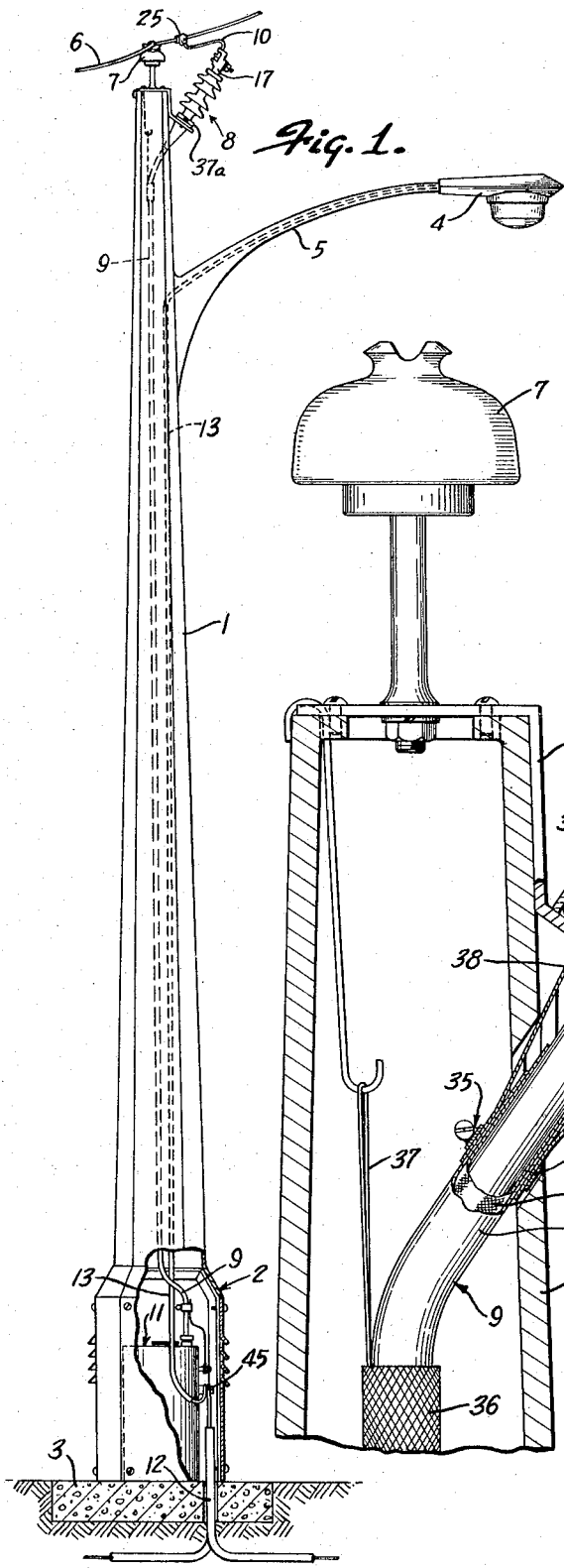
FIG. 1 is a side elevation view of a street lighting pole unit illustrating an application of the present invention.

Referring to the drawings and particularly to FIG. 1, a vertical power pole 1 includes a lower rectangular box-like base 2 which is mounted on a suitable supporting concrete slab 3. A luminaire or street lamp 4 is carried adjacent the upper portion of the pole 1 by a cantilever mast arm 5 which is suitably spaced from the upper end of the pole 1. A primary conductor or line 6 forming a part of an aerial or overhead open wire primary of a power distribution system is secured to the uppermost end of the pole 1 by an insulating and supporting dead end unit 7. A cable termination unit 8 forming the upper end of a sheathed tap cable 9 is secured to the side of the upper end of the pole 1. A jump strap 10 is connected to line 6 and to unit 8 to connect cable 9 to the primary power system. Cable 9 extends downwardly through the pole 1 and is interconnected at its lower end to a transformer unit 11 mounted within the rectangular box-like pole base 2. The transformer 11 is interconnected with the secondary distribution cable 12 of an underground secondary distribution system for providing relatively low voltage power to the consumers. In the illustrated embodiment of the invention, a secondary line 13 is shown projecting upwardly through the pole 1 to provide power to the lamp 4.

The present invention is particularly directed to the construction of a sheathed tap cable 9 and particularly the interconnection of this cable to the primary line 6 and the transformer unit 11.

Figure 2:
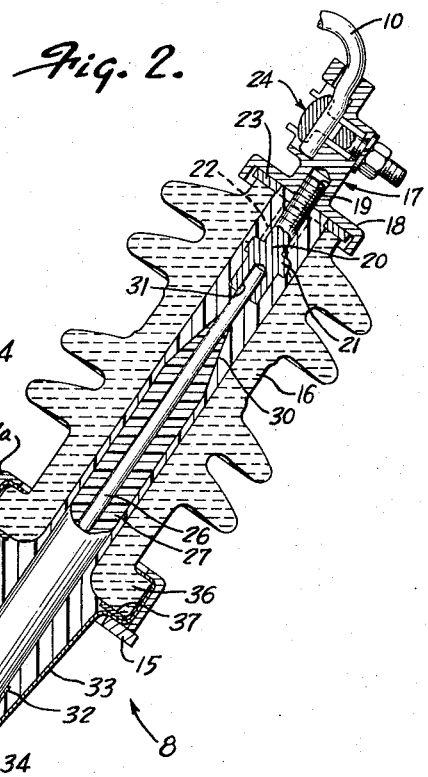
FIG. 2 is an enlarged view of the top of the pole unit shown in FIG. 1 with the cable termination unit shown in section.

Referring particularly to FIG. 2, the upper cable termination unit 8 which may be prefabricated with cable 9 at the factory is shown supported adjacent the upper end of the pole 1 by mounting bracket 14 which is bolted or otherwise releasably overlying the upper end of pole 1. Bracket 14 includes an apertured mounting flange 15 which projects generally horizontally outwardly with the cable termination unit 8 mounted therein.

Generally, the termination unit 8 includes a tubular porcelain skirted bushing or shroud 16 within which the cable 9 is terminated and connected to a terminal 17 for connection to line 6. The cable 9 extends through the lower end of shroud 16 and is connected to terminal 17 at the outer or upper end of the shroud.

Generally, the terminal 17 includes a cup-shaped base 18 which overlies the outer end of the shroud 16 and has a centrally located inner tapped opening 19 axially aligned with the shroud opening. The base 18 threads onto a terminal stud 20 which extends from the interior of the shroud 16 and is connected to the conductor of cable 9. Stud 20 includes an inner head 21 which engages the inner portion of a plurality of shoulders 22 formed within the outer end of shroud 16 to securely clamp the terminal 17 to the upper end of the shroud. A suitable gasket 23 is shown disposed between the cup-shaped base 18 and the top edge of the shroud 16 to establish a liquid-tight joint and also to prevent undue stressing of the porcelain shroud.

The terminal 17 includes an eye-bolt and nut unit 24 of a known construction which is adapted to receive one end of the jumper cable 10, the opposite end of which is suitably secured by a vise-type clamp 25 or the like to the primary line 6, as shown in FIG. 1.

Power is thus tapped off the primary line 6 and fed through the jumper strap 10 and the terminal 17 to the sheathed cable 9 and thus to the transformer 11.

Generally, the illustrated sheathed cable includes an inner solid conductor 26 encased in cable insulation 27. A semi-conducting tape 28 is wrapped on the insulation 27 within an outer lead jacket or sheath 29 which is connected to ground potential, as subsequently described.

The upper end of the cable 9 projects inwardly through the shroud 16 and the upper end is penciled as at 30 to remove the insulation 27 and expose a short length of conductor 26 which is soldered or otherwise secured within a corresponding recess 31 in the innermost end of terminal stud 20.

The upper end of semi-conducting tape 28 and outer sheath 29 are stripped from the penciled end of the cable 9 to provide a predetermined flashover or creepage distance between the bared conductor 26 and the grounded sheath 29 to prevent flashover under normal operating conditions. In accordance with the present invention, the semi-conducting tape 28 extends beyond the termination of sheath 29, as at 32. The sheath 29 and semi-conducting tape 28 are removed beyond the lower end of the shroud 16 and a potential grading cone 33 is secured between the shroud 16 and the adjacent end of the sheath 29.

The potential grading cone 33 is generally an integral solid member of lead or other suitable material and includes a ring portion 34 encircling the upper end of the cable sheath 29. A clamp 35 encircles the ring portion 34 and securely clamps the grading cone 33 physically and electrically to the sheath 29. The grading cone flares outwardly and axially to the lower end of the shroud 16 and is rolled over the outer periphery of an integral flange 36 on shroud 16. A gasket 37 is disposed between the under surface of the shroud flange 36 and the adjacent rolled portion of the cone 33. A split clamping ring 37a is shown securing the termination unit 8 to the mounting flange 15. An insulating compound 38 having high dielectric and mechanical strength, excellent bonding qualities and a high dielectric constant, such as an epoxy resin, fills shroud 16 and grading cone 33. Upper termination unit 8 is preferably assembled to cable 9 and insulating compound 38 poured into shroud 16 and cone 33 at the factory, and preferably insulating compound 38 is vacuum treated after blending to remove all of the entrapped air.

The grading cone 33 generally serves to uniformly distribute the electrical stress, not shown, adjacent the terminated end of the sheath 29 to permit a more uniform distribution of voltage stress across the insulation between the conductor and the ground plane at the termination of sheath 29. In accordance with one feature of the present invention, the extension 32 of the semi-conducting tape 28 from the terminated end of the sheath 29 provides a resistive grading of the potential and an improved distribution of the stress adjacent the terminated end of the sheath.

For example, the semi-conducting tape may be a nylon fabric material having a low conductive filler which constitutes a relatively poor conductor when compared to the conventional metallic conducting material such as copper, lead and the like. It appears, however, as a relatively good conductor compared to the over surface conducting path at the surface of insulation 27 to the terminated end of sheath 29. The semi-conducting tape extension 32 thus provides a series circuit in the axial direction with the surface conducting path of the insulation 27 and establishes a voltage dividing network. A relatively small voltage drop therefore appears across the semi-conducting tape extension 32 because of its relative low resistivity and this drop is distributed over a relatively substantial length of the path. As a result, the points at which the lines of force emanate are distributed along the end of the sheath and the semi-conductive tape 28 and provide an improved axial distribution of the stress on insulation 27.

Generally, in forming the upper termination unit 8, the end of cable 9 is prepared to the penciled point 30 and connected to terminal stud 20. The grading cone 33 and shroud 16 are assembled with the cable 9. The assembly is supported in a vertical position and the insulating compound 38 introduced, preferably at the factory through the upper open end of the shroud 16.

After the resin 38 is cured, the terminal 17 is screwed onto the upper projecting end of the terminal stud 20 to complete the upper termination unit 8.

Figure 4:
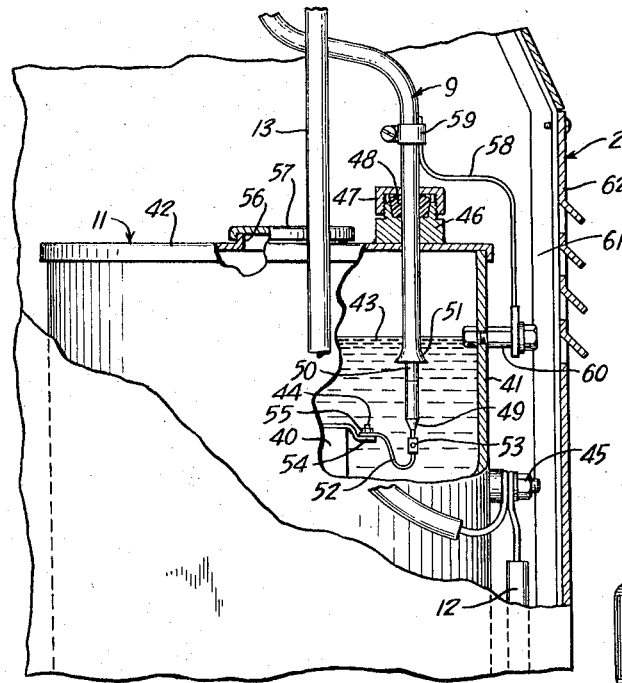
FIG. 4 is an enlarged view of a lower portion of the unit shown in FIG. 1, with parts broken and sectioned to show details of the present invention.

The termination unit 8 projects through the mounting flange 15 of bracket 14 into an opening in the side of the pole 1 with cable 9 dropping through pole 1 to transformer 11. A cable support 36 is secured to the cable 9 adjacent the opening in the pole 1 and includes a loop 37 which projects upwardly and terminates in a hook which is hooked over the upper end of the pole 1 to vertically support the sheathed cable 9 and remove the weight on the termination unit 8. The lower end of cable 9 is terminated within and connected to the transformer unit 11, as more fully shown in FIG. 4.

The transformer unit 11 is any suitable oil filled distribution transformer and is shown having a transformer 40 mounted within a tank 41 provided with a removable top cover 42. Oil 43 substantially fills the tank 41 to a predetermined spacing from the tank cover 42. The space at the top of tank 41 allows expansion of the oil 43 under operating conditions which as a result of the heat generated by the transformer 40 may continuously maintain the oil 43 at elevated temperatures of approximately 105° centigrade. Transformer 40 is provided with a primary connecting terminal stud 44 within oil 43 in the tank 41 for connection to the lower end of the sheathed cable 9 and a plurality of secondary insulating bushings 45 which are mounted in the side wall of the tank 41 for connection to the underground secondary distribution lines 12 which project upwardly through a suitable opening in the slab 3. Power tapped from the primary line 6 is thus transmitted by the transformer 11 at a suitable reduced voltage to the secondary distribution system and to street light 4.

The lower end of the sheathed cable 9 passes directly through a tubular boss 46 provided in the top cover 42. A gland nut 47 is threaded onto the boss 46 with a sealing grommet 48 disposed therebetween to support the lower end of cable 9 and to hermetically seal the opening through the boss 46. Generally, the lower end of the cable 9 is dressed similarly to that of the upper end to provide a pencilled connection point 49 with the sheath 29 and the semi-conducting tape 28 stripped from the cable. The semi-conducting tape 28 extends axially beyond the sheath 29, as at 50 in the same manner as in the upper termination.

The lowermost end of the sheath 29 is flared outwardly to create an integral potential grading cone 51 terminating in spaced relation to the termination of tape extension 50. The lower end of the cable 9 is supported by the gland nut 47 with the potential grading cone 51 completely submerged within the cold oil level of the insulating oil 43 of transformer unit 11 and is thereby continuously maintained immersed under all use of transformer 40.

A flexible cable 52 of copper with suitable tinned ends or the like is secured to the lowermost end of the cable 9 by a suitable flexible clamp connector 53, such as a screw and sleeve type. A lug 54 is soldered or otherwise secured to the opposite end of the flexible cable 52 and is apertured to fit over the primary terminal stud 44, as shown. A terminal clamp nut 55 is threaded onto stud 44 and releasably interconnects the lug 54 thereto. A hand hole 56 is provided in the upper cover 42 of the tank 41 through which the flexible cable 52 may be readily connected and disconnected from the primary terminal stud 44. A hand hole 56 is releasably closed by a hand hole cover 57.

The lower termination of cable 9 provides a very simple and inexpensive potential grading system wherein the transformer oil 43 serves the dual function of maintaining protection of the transformer 40 as well as serving as the insulating compound of the potential grading cone. This construction eliminates the necessity of a primary insulating bushing at the transformer unit 11 and allows the very simple gland-type support and seal, such as illustrated although any other suitable means of support may be provided. The insulation 27 is insoluble in oil 43 and maintains its properties at the elevated temperatures of oil 43 when transformer 40 is energized. Thus, conventional polyethylene cable insulation is unsatisfactory and it has been discovered that polyvinyl chloride insulation does not deteriorate even when continuously immersed in hot transformer oil at 105° centigrade.

Although the lower end of cable 9 is immersed in the oil, siphoning within the cable is prevented by the hermetic seal at the upper end of the cable established by the insulating resin 38.

A ground cable 58 is clamped at one end to the cable sheath 29 by a suitable clamp 59 and at the opposite end to a ground pad 60 provided on the exterior of the tank 41. Ground pad 60 may be connected by suitable conductor means, not shown, to the underground neutral conductor in a common neutral power system or to a grounding rod, not shown, extending into the earth.

The base 2 of pole 1 generally includes a supporting superstructure 61 which transmits the weight and bending loads on the pole 1 to the slab 3. Removable side walls 62 are secured to the superstructure 61 to allow ready access to the transformer 40 for maintenance, replacement and the like.

In accordance with the present invention, the flashover characteristics of the termination unit 8 and of the lower termination of the sheath cable 9 and connection to the transformer unit 11 are correlated to essentially prevent the possibility of damaging flashovers to the transformer 40. Thus, the flashover characteristics of the unit 8 are selected to break down externally and establish a conducting path prior to establishment of voltages of a sufficient magnitude to flashover between the sheath cable 9 and the transformer 40.

Figure 5:
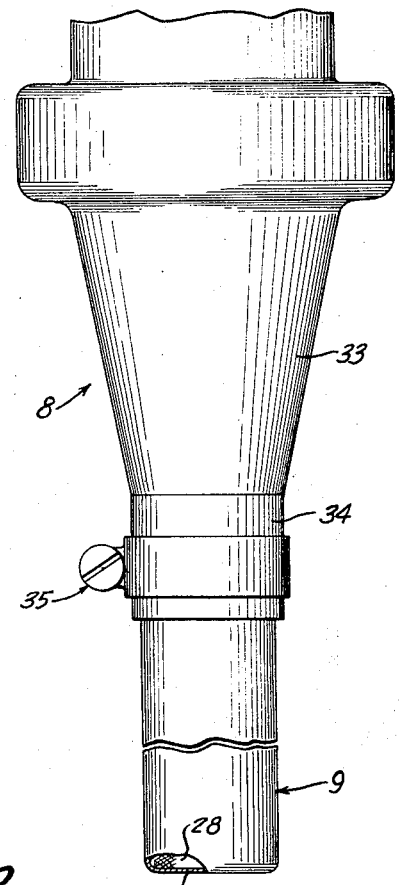
FIG. 5 is a fragmentary elevational view showing the preferred factory construction of the tap cable shown in FIGS. 1–4.
Figure 3:
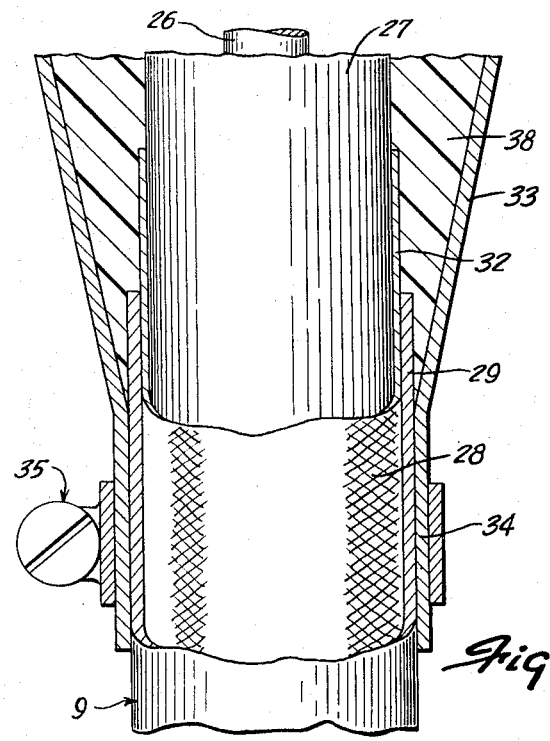
FIG. 3 is an enlarged fragmentary portion of FIG. 2 more clearly showing the termination of the cable sheath.

In accordance with another aspect of the present invention, the termination unit 8 is formed with the cable 9 at the factory in order to provide a very efficient and reliable termination. The only work done in the field would be the cutting of the sheathed cable 9 to the desired length and the preparation of the lower end of cable 9 to form the exposed conductor 26 and potential grading cone 51. The necessary length of the cable 9 will often vary from application to application and consequently provision is preferably made to permit length adjustment. It will be appreciated, however, that cable 9 may be cut to proper length and assembled with upper termination unit 8 and pole 1 at the factory before shipment. The lower end of cable 9 is hermetically sealed in shipment to prevent entry of moisture into the sheathed cable. The upper end will of course be sealed at the factory by the insertion of the insulating compound 38. The lower end may be sealed in any suitable manner; for example, as shown in FIG. 5 wherein a cap 63 is soldered to the sheath 29.

Referring particularly to FIG. 6, construction of a primary tap termination unit is shown incorporating a fuse cutout as an integrated part thereof.

In FIG. 6, a vertical pole 64 similar to pole 1 includes a mounting cap 65 welded or otherwise secured to the upper end. An integrated cable termination and fuse cutout unit 66 is secured within an aperture in the mounting cap 65 and projects upwardly therefrom and terminates in a primary wire support and terminal unit 67. An overhead primary line 68 is connected directly to the support and terminal unit 67 for supporting of the primary line while simultaneously providing an electrical takeoff from the primary line 68 to a sheathed top cable 69.

In accordance with the embodiment of the invention illustrated in FIGS. 6 and 7, the integrated termination and fuse cutout unit 66 includes a lower porcelain shroud 70 having cylindrical tubular ends. A metallic lower mounting plate 71 is provided with a recess within which the lower end of shroud 70 is secured by a suitable cement 72. The mounting plate projects radially from the shroud 70 and is provided with a plurality of openings aligned with correspondingly tapped openings in the mounting cap 65. Suitable attachment bolts 73 project through the openings in the mounting plate 71 and thread into the tapped openings of the cap 65 to fixedly secure the integrated termination and fuse cutout unit 66 to the top of the pole 64. The sheathed cable 69 extends vertically upwardly through the shroud 70 with the upper end pencilled in accordance with the previous description of the preparation of the upper end of cable 9 illustrated in FIGS. 1–4, inclusive. In FIG. 7, a potential grading cone 74 is secured to the sheathed cable 69 as by a clamp 75. The cone 74 extends or opens upwardly and terminates in a tubular circular ring 76 which fits within a depending annular shoulder 77 on the mounting plate 71. The shroud 70 and cone 74 are completely filled with the insulating resin 78 having high mechanical and dielectric strength, a high dielectric constant and excellent bonding qualities, as heretofore discussed. The resin 78 similarly bonds to the adjacent surfaces to mechanically unite and integrate the shroud 70, cable 69, mounting plate 71, and grading cone 74.

The upper end of the shroud 70 is closed by an adaptor plate 79 having a tubular projection 80 into which the upper end of the shroud 70 is cemented by a suitable cement 81 or the like. The plate 79 is generally a solid plate which spans the open top of the shroud 70 to essentially seal the upper end thereon. It is provided with a central opening aligned with the incoming cable 69 and with the upper or outer end of the opening generally defining a frusto-conical recess. The bare end of cable 69 projects upwardly through the opening and is secured therein by solder 82 or the like filling the recess and the opening. A pair of filling openings 83 and 84 is provided in the plate 79 on the opposite sides of cable 69 and in alignment with the opening through the shroud 70.

In assembling the unit, the lower shroud 70 is interconnected to the mounting plate 71 and the adaptor plate 79. The grading cone 74 is secured to the cable 69 after which the cable is threaded through the shroud 70 and solder 82 applied to connect the cable to plate 79. The assembly is then filled with the resin 78 by introducing the resin as a liquid, preferably at the factory, through the one opening 83 with the air therein escaping from the other opening 84. During the filling operation, the assembly can be held in any suitable fixture with the upper end of the grading cone 74 securely held in sealed engagement with the annular shoulder 77. The resin filled assembly should be allowed to remain in the fixture until the resin 78 had set to a sufficient degree to mechanically interconnect the shroud 70 to the cable 69 and the grading cone 74.

A second porcelain shroud 85 corresponding to the lower shroud 70 is secured by mounting plate 86 to the top of adaptor plate 79. The mounting plate 86 is provided with a suitable annular projection into which shroud 85 is secured by cement 87. A plurality of nut and bolt assemblies 88 interconnect the adaptor plate 79 and the mounting plate 86 to rigidly interconnect the upper shroud 85 and the lower shroud 70 in vertically stacked relation. The mounting plate 86 is a continuous member with the shroud 85 projecting axially outwardly therefrom and terminating in the primary wire support and terminal unit 67. The upper shroud 85 is filled with a suitable insulating resin 89 which may be similar to that employed in the lower shroud 70. However, the insulating resin 89 within the upper shroud does not generally function as a high dielectric medium and consequently, can be any other suitable insulating compound. The opening at the upper end of the shroud 85 is somewhat enlarged and a terminal stud 90 forming a part of the terminal unit 67 has its head portion 91 embedded within the resin 89 therein. In assembly, the shroud 85 may be filled with resin 89 to the lower or inner level of the stud 90 which may then be embedded in the same or a different compound. For purposes of convenience, a single compound is preferably employed with the stud suitably held in place while introducing the resin 89 to one side of the opening such that air can escape upwardly along the other side of the opening.

A terminal cap 92 is threaded onto the terminal stud 90 into bearing engagement with the upper end of the shroud 85. A suitable gasket 93 may be disposed between the cap 92 and the upper end of the shroud 85. A clamping jaw 94 is slid down over the stud 90 and complementary recesses 95 and 96 are formed in the cap 92 and the jaw 94 to establish a vise-type clamp for the primary line 68. A locking nut 97 is threaded onto the terminal stud 90 to securely hold the jaw 94 in clamping relation with the primary line 68 disposed between the jaw 94 and cap 92. In this manner, the primary line 68 is physically supported in insulated relation on pole 64 without the necessity of any other type of support.

A fuse cutout 98 is connected between the terminal stud 90 and the adaptor plate 79 to electrically interconnect the primary line 68 to the upper end of the sheathed cable 69.

The illustrated fuse cutout 98 is of any suitable variety and is diagrammatically illustrated as including a fuse tube portion 99 with fuse cutout terminal arms projecting axially from opposite ends thereof and terminating in enlarged heads 100 and 101.

The fuse cutout 98 is supported externally of shroud 85 between a pair of supporting spring members 102 and 103 secured respectively to the adaptor plate 79 and to the terminal stud 90. Although cutout 98 is shown mounted externally of the shroud to provide a visual display, it can within the concept of the present feature of the invention be mounted internally.

The upper spring member 103 slips over the terminal stud 90 and is clamped between the clamping nut 97 and an outer lock nut 104. The spring member 103 extends radially outwardly and slightly upwardly with the upper end bifurcated to receive end 100 of the fuse cutout 98.

The lower spring member 102 is secured to the adaptor plate 79 by one of the nut and bolt assemblies 88. The spring member 102 projects radially and upwardly therefrom with a spring loop 105 formed intermediate the length thereof. The outer end of member 102 is bifurcated to receive the lower head 101 of the fuse cutout 98.

Generally, the illustrated embodiment of the invention maintains the advantages of the previously described embodiment of the invention and in addition provides fuse cutout integrated directly into the unit and provides an integrated primary wire tap and primary wire support. Further, the mounting of the cutout assembly on the very upper end of the pole in axial alignment therewith provides a very simple and ready means of mounting the unit while maintaining highly aesthetic values.

The present invention thus provides a highly improved primary takeoff for power distribution systems and the like including improved means for interconnecting of a primary takeoff cable to the primary line as well as to auxiliary equipment such as a transformer. The potential grading cone system of the present invention which incorporates the partial resistive grading provides a highly satisfactory and reliable method of terminating a cable sheath.

Various modes of carrying out the invention are contemplated as being within the scope of the following claims particularly pointing out and distinctly claiming the subject matter which is regarded as the invention.

We claim:
1. In combination with a high voltage line and a power pole, a tap cable unit comprising,
    (a) a pair of stacked tubular insulating shrouds separated by a conductive plate means,
    (b) a high voltage cable one end of which projects into a first of said shrouds and having a central conductor encased in insulation and having a bared end secured to said plate means, said cable having an outer ground sheath stripped from the end beyond the corresponding shroud,
    (c) a grading cone secured to the terminal portion of the sheath and extending axially into engagement with the first shroud,
    (d) an insulating medium filling said first shroud and said grading cone,
    (e) mounting means connected to the cone end and to the top of the pole of the first shroud mounting the tap cable unit on the top of the pole with the stacked shrouds extending vertically upwardly therefrom,
    (f) a combined line support and power connector secured to the outer end of the second of said shrouds, said high voltage line being releasably secured to the connector constituting the sole support at the pole for the line, and
    (g) a fuse cutout connected at opposite ends to the connector and the conductive plate means.

2. In combination with a high voltage line and a power pole, a tap cable unit comprising,
    (a) a mounting plate adapted to be secured to the top of the pole and having an upper tubular embossment on the top face thereof,
    (b) a tubular insulating shroud having its lower end cemented within the upper tubular embossment,
    (c) an adaptor plate having a lower tubular embossment cemented to the upper end of the shroud,
    (d) a sheathed cable extended through the shroud and having a central conductor secured to the adaptor plate, said cable having a conductor insulation and an outer ground sheath stripped from the insulation to a selected distance outwardly of the shroud,
    (e) a potential grading cone having a narrow neck secured to the terminal portion of the sheath and to the underside of the mounting plate,
    (f) an insulating compound completely filling said grading cone and said shroud to hermetically seal the upper end of the cable to distribute the potential,
    (g) a second tubular insulating shroud fixedly mounted on the adaptor plate and extending vertically upwardly therefrom,
    (h) an insulating resin filling said second shroud,
    (i) a line clamp secured to the upper end of the second shroud to receive the high voltage line and serving as the sole support therefore adjacent the pole, and
    (j) a fuse cutout connected to the line clamp and the adaptor plate.

3. The combination of claim 2 wherein,
    (a) the insulating compound filling said grading cone and first shroud in a resin which bonds to adjacent surfaces to physically interconnect the grading cone to the shroud and mounting plate.

4. In combination with a high voltage line and a power pole having a centrally apertured cap secured to the upper end of the pole and having distributed tapped openings, a tap cable unit comprising, (a) a mounting plate disposed on said cap and having openings aligned with the tapped openings and having a lower and upper tubular embossment on the opposite face thereof, (b) bolt means releasably securing the mounting plate to the cap, (c) a tubular insulating shroud having its lower end cemented within the upper tubular embossment, (d) an adaptor plate having a lower tubular embossment cemented to the upper end of the shroud and having a planar upper face, said adaptor plate having a central conductor opening and a pair of filling openings, (e) a sheathed cable extended through the shroud and having a central conductor terminating within the conductor opening, said cable having a conductor insulation and an outer ground sheath stripped from the insulation to a selected distance outwardly of the shroud, (f) a potential grading cone having a narrow neck secured to the terminal portion of the sheath and a large neck disposed within the lower tubular embossment of the mounting plate, (g) an epoxy resin completely filling said grading cone and said shroud to hermetically seal the upper end of the cable and to physically connect the grading cone to the shroud and mounting plate and to distribute the potential, (h) a second tubular insulating shroud, (i) a mounting plate having an upper tubular embossment with the tubular shroud cemented therein and a bottom planar surface, (j) means securing the second mounting plate to the adaptor plate with the second shroud extending vertically upwardly therefrom, (k) an insulating resin filling said second shroud, (l) a terminal stud secured within the insulating resin and projecting upwardly of the second shroud, (m) a line clamp secured to the terminal stud and connected to the high voltage line and serving as the sole support therefore adjacent the pole, (n) a fuse cutout of a substantial length, and (o) a pair of arms secured respectively one each to said line clamp and said adaptor plate and extending substantially radially of the second shroud to receive and support the opposite ends of said fuse cutout.

5. A cable termination unit for an insulating conductor of a high voltage cable having an outer lead sheath stripped from one end, (a) an insulating shroud into which the stripped end of the cable projects, (b) a line terminal secured to the conductor and supported by the shroud, (c) a grading cone secured to the terminal portion of the sheath and projecting axially and radially of the cable into engagement with the shroud, (d) an insulating medium filling said grading cone and shroud, (e) an insulating member secured to the shroud and projecting outwardly from said line terminal, (f) a combined line support and electrical tap unit secured to the outer end of the insulating member, (g) a fuse cutout connected at opposite ends to said line terminal and said electrical tap unit, and (h) mounting means connected to the electrical tap unit and having means adapted to be secured to a power pole and to locate said tap unit in supporting relation to the power line and constituting the sole support therefor at the power pole.

6. In combination with a high voltage line and an oil-filled transformer unit having a tap cable opening and filled with oil to a selected level, a tap cable unit, which comprises, (a) a sheathed cable having an inner conductor enclosed in a solid insulation insoluble in the oil of said transformer unit covered by a semi-conductive tape and an outer conducting sheath adapted and designed to be connected to ground, said cable having the ends pencilled to bare the conductor and having the sheath and tape stripped from the bared ends for a selected length, said sheath being stripped slightly further than said tape at each end of the cable to establish partial resistive potential grading at the ends of the sheath, one end of the sheath being belled to form a cone and extending downwardly through the cable opening in the transformer unit, (b) a line termination unit secured to the end of the cable opposite the belled end and including, (1) a single-piece tubular porcelain shroud coaxially mounted about a bared end of the cable in axially spaced relation to the adjacent end of the sheath, (2) a terminal in the end of the shroud connected to the bared conductor and to the high voltage line, (3) a grading cone having a narrow tubular neck telescoped over the outer end of the sheath in firm electrical engagement therewith and projecting axially and radially therefrom into engagement with the adjacent portion of the shroud, (4) a high dielectric constant epoxy resin completely filling the space between the cable and said shroud and cone, (c) means connected to said transformer unit and cable and supporting the belled end of the cable with the grading cone below the cold oil level of the oil in the transformer unit and to seal the cable opening, (d) means electrically connecting the inner conductor to the transformer unit and constructed and arranged to have a selected flashover voltage, and (e) said line termination unit being constructed and arranged to have a flashover voltage below said selected flashover voltage.

References Cited by the Examiner

UNITED STATES PATENTS

| | | | |
|---|---|---|---|
| 893,285 | 7/1908 | Tompkins | 174—76 X |
| 1,498,169 | 6/1924 | Jacobs | 174—76 X |
| 2,089,284 | 8/1937 | Milliken | 174—76 X |
| 2,273,538 | 2/1942 | Rogers | 174—75 X |
| 2,353,719 | 7/1944 | Goldfield | 174—75 |
| 2,881,125 | 4/1959 | Waterman | 174—18 X |
| 2,961,518 | 11/1960 | Hermann | 200—114 X |
| 3,187,175 | 1/1965 | Lang | 174—45 X |

FOREIGN PATENTS 866,043  4/1961  Great Britain.

LARAMIE E. ASKIN, *Primary Examiner.*